United States Patent [19]

Killian

[11] 4,184,784
[45] Jan. 22, 1980

[54] TERMINATION AND METHOD OF TERMINATING ROPES OR CABLES OF ARAMID FIBER OR THE LIKE

[75] Inventor: Bruce A. Killian, Van Nuys, Calif.

[73] Assignee: The Bendix Corporation, North Hollywood, Calif.

[21] Appl. No.: 921,547

[22] Filed: Jul. 3, 1978

[51] Int. Cl.$^2$ .......................................... F16G 11/05
[52] U.S. Cl. .................... 403/267; 403/275; 24/122.6; 29/458
[58] Field of Search ............... 403/275, 280, 277, 265, 403/266, 267, 185, 268; 24/265 EE, 122.3, 122.6; 29/458, 525

[56] References Cited

U.S. PATENT DOCUMENTS

| | | | |
|---|---|---|---|
| 3,409,951 | 11/1968 | Morieras | 403/275 X |
| 3,475,795 | 11/1969 | Youngblood | 24/122.6 |
| 3,562,406 | 2/1971 | Uhlig | 24/122.6 X |
| 3,570,074 | 3/1971 | Schimmeyer et al. | 403/267 |
| 3,573,346 | 4/1971 | Appleby | 403/267 X |
| 3,723,636 | 3/1973 | Eucker | 403/185 |

Primary Examiner—Andrew V. Kundrat
Attorney, Agent, or Firm—Robert C. Smith; William F. Thornton

[57] ABSTRACT

A termination and method of terminating braided ropes or cables of aramid fiber includes fabricating short tapered reinforcement ropes of the same material which are inserted at each end of each rope to increase its thickness, forming a collar having a tapered interior channel and a tube to fit inside the channel having a tapered outside surface. The reinforced rope ends (four, in this example) are tied off near their ends, separated into individual fibers, and any coating thereon washed out. These ends are then dipped into a suitable resin potting compound. A centering tool is inserted through the bore of the tube and used to pull the tube tightly into the interior of the collar, thereby compressing the ropes including the resin-coated ends tightly between the collar and the tube. The resin is then cured. Where it is desired to terminate both ends, the ropes initially terminated are doubled to leave loops at the opposite end. These loops are assembled onto pulleys and tensioned a number of times to equalize the lengths of the ropes. The four ropes then resulting are cut to equal lengths, and the second end is terminated as set forth above.

12 Claims, 9 Drawing Figures

TERMINATION AND METHOD OF TERMINATING ROPES OR CABLES OF ARAMID FIBER OR THE LIKE

BACKGROUND OF THE INVENTION

The introduction of aramid fibers having great tensile strength has made possible a number of applications for lightweight, high strength cables or ropes, particularly in the area of underwater cables and arrays. The strength members in such cables have traditionally been of steel which has provided the desired strength but at a considerable cost in weight. Recent studies using ropes of aramid fibers have shown that such ropes, which are very lightweight as compared with steel wire ropes of equivalent tensile strength, have applications for which steel cannot be used because of its weight but where aramid filament ropes may be used.

As compared with steel, however, such aramid cables or ropes which are marketed under the name Kevlar (a trademark of duPont Corporation) have certain properties requiring special handling. While steel wire ropes have a yield point after which they will stretch significantly before they break, Kevlar has no such yield point. Thus a conventional wire rope, when stretched close to its tensile limit, may experience overloading past the yield point on some strands, but these strands simply stretch somewhat and continue to carry their share of the load. Aramid fibers have no such characteristic, however, and tend to retain their length right up to the breaking point. Because of this, it has been difficult to provide satisfactory terminations for such aramid cables or ropes since any significant variation in strand length causes the load to be carried on the shortest strand until it breaks, then the next shortest, etc., with each strand failing under load until all are broken. Consequently, the weakest part of such a rope has usually been at the termination or just at the point where the rope or cable enters the termination. Frequently such failures occur at loadings which are no more than 60-70% of the known strength of the cable or rope.

SUMMARY OF THE INVENTION

When terminating a cable or rope of Kevlar which may consist of a plurality of braided strands, it is desirable to maximize the strength of the rope at the termination by equalizing the lengths of each strand to the extent possible. Part of this requires that the individual strands be firmly anchored so that no one strand or fiber may slip relative to the others, thus becoming effectively longer and transferring its load to the remaining strands. To augment the strength of the cable or rope, it has been found that the ends of the strands can advantageously be reinforced by means of tapered lengths of similar rope which may be of any desired length but which the inventor herein made about 15 inches long and from which individual strands are removed at intervals of approximately one inch until the rope is down to one strand at one end. Then tapered lengths of rope are inserted into the side near the end of each braided strand and worked toward the end, thereby providing a gradual thickening and reinforcing of each braided strand.

A cylindrical collar, which may also be externally threaded, has an internal bore or channel which is of a varying taper from a minimum diameter near one end to a substantially larger diameter at the opposite end. This cooperates with a tapered tube having a larger outside diameter near one end. The collar is preferably slipped over the cable before the tapered reinforcing members are inserted.

The braided strands are then "fuzzed" or separated to individual fibers for a suitable length, such as ¾ inch, such that the individual fibers extend generally axially and any coating removed. These fibers are then dipped in a suitable resin potting compound, a centering tool is inserted in the tapered tube, and the tube inserted at the center of the several braided and "fuzzed" strands. The collar is then pulled over the assembly, leaving the strands including the resin-coated "fuzzed" part plus part of the braided length tightly wedged between the tapered tube and the varying taper of the interior surface of the collar. The resin is then cured by suitable means appropriate to the particular resin. Where, as is frequently required, the application requires that both ends be terminated, the terminated end is fastened to an anchor or deadman. The ropes are initially doubled over so that the opposite ends are loops which are pulled up by use of a winch operating through pulleys on each loop. These ropes are first lightly stressed to make sure the pulleys are operating free and that no twists, etc. are in the ropes. They are then repeatedly tensioned to very substantial values to compensate any differences in elastic modulus between the individual ropes. After measuring carefully to get the ropes to the desired length, the ropes are cut and the termination attached to the opposite end as described above.

DESCRIPTION OF THE DRAWINGS

FIG. 3b is a sectional view taken on line 3b—3b in FIG. 3a.

DESCRIPTION OF THE PREFERRED EMBODIMENT

Figure 1A:
FIG. 1a is a side view of a typical length of a braided aramid fiber rope.
Figure 1B:
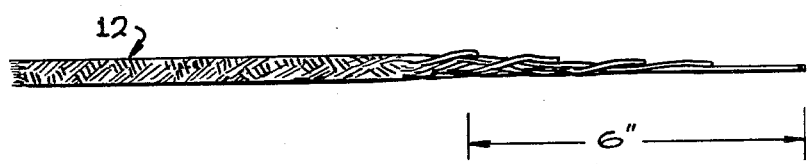
FIG. 1b is a side view of a length of stranded aramid fiber which has been tapered.
Figure 1C:
FIG. 1c is a side view of a length of braided aramid fiber rope having the length of tapered aramid fiber inserted near its end as reinforcement.

FIG. 1a shows a length of braided rope or cable 10 of aramid fiber. For the particular application with which the inventor herein was working, this rope is of Phillstran Kevlar braid approximately 1/10 inch in diameter (a product of Philadelphia Resins Corporation) and combined in parallel strands of three or more as strength members which keep tensile loads from conductors in an underwater cable. Each rope consists of an inner braided layer and an outer braided layer. The groups of ropes are terminated at a connector and are preferably initially pulled through a collar member thereof. Part of the termination involves reinforcing the ends of each rope with an insert of stranded aramid fiber rope 12 as shown in FIG. 1b. Such a stranded rope may be about 3/32 inch in diameter and be composed of seven strands. This stranded rope is normally cut in lengths of 15 inches to two feet, and beginning about six inches from one end a strand is cut off every ¾ inch to one inch, thus tapering the diameter until only one strand remains. For other sizes of braided rope, reinforcing members having different numbers of strands may be used. This will give rise to different lengths of taper and may result in different lengths of reinforcing ropes 12. Each of the four braided ropes or cables is reinforced through insertion of such tapered stranded ropes. To maintain all four (or more) ropes at the same length from the end, it is desirable to carefully lay off lengths of about three feet and carefully tie these ropes together with lacing cord. After the ropes are tied together, each rope is separated and its outer braided layer stripped back to approximately the distance of the lacing cord. Starting at a point about thirty inches from the end, the tapered reinforcing strand 12 is inserted into the inside braided layer of rope 10 and worked forward. The inner braided layer is then worked back tightly over the tapered section, followed by the outer braided layer, and all strands are cut off evenly. The rope is now reinforced in the last 15 inches or so of its length and tapers from its original 1/10 inch diameter to approximately 3/16 inch in thickness.

When all four ropes 10 have been reinforced as described and trimmed evenly, each has a layer of lacing 14 wrapped tightly around its outer layer about ¾ inch from the end. Using compressed air, a dish of freon and a wire brush, the end of each rope is successively dipped into the freon and brushed to remove the urethane matrix which is normally present to improve the resistance of the aramid fibers to damage from abrasion. The fibers are brushed out or "fuzzed" and dried with compressed air until they are largely separated into individual, generally axially directed fibers as shown at numeral 16.

Figure 2:
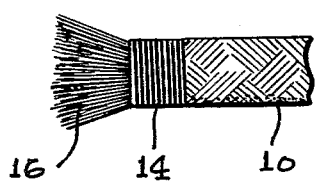
FIG. 2 is a side view of the reinforced aramid rope of FIG. 1c with the individual end fibers separated.
Figure 3A:
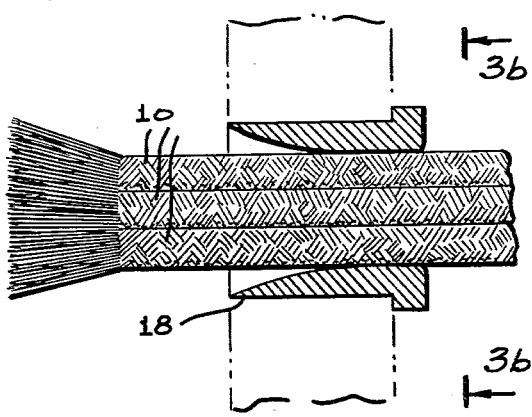
FIG. 3a is a side view, partially in section, of a plurality of ropes like that of FIG. 2 inserted through a collar connector.
Figure 3B:
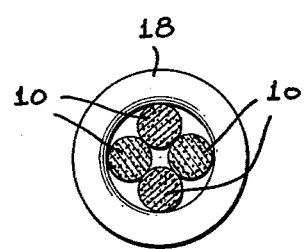

FIG. 3a is a side view, partly in section, showing three of the four reinforced ropes 10 which have been "fuzzed" as shown in FIG. 2 and which are pulled through the interior channel of a collar member 18. It will be observed that the interior channel of collar member 18 is contoured in a smoothly varying taper which avoids abrupt bends placing concentrated loads on the individual fibers. Testing with a collar which tapered uniformly to a given bore found fibers breaking at the junction between the cylindrical bore and the frustoconical uniformly tapered bore. FIG. 3b is a sectional view taken on line 3b—3b showing four of the reinforced rope 10 passing through the collar 18.

Figure 4:
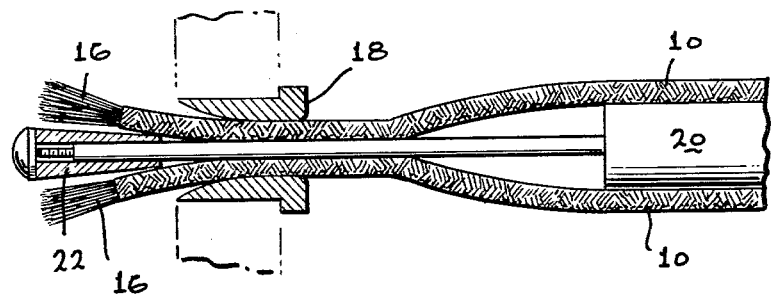
FIG. 4 is a side view of an aramid rope structure similar to that of FIG. 3 but after a potting step and with a centering tool and tapered tube located such that said tube may be pulled into the center of said ropes and said collar.
Figure 5:
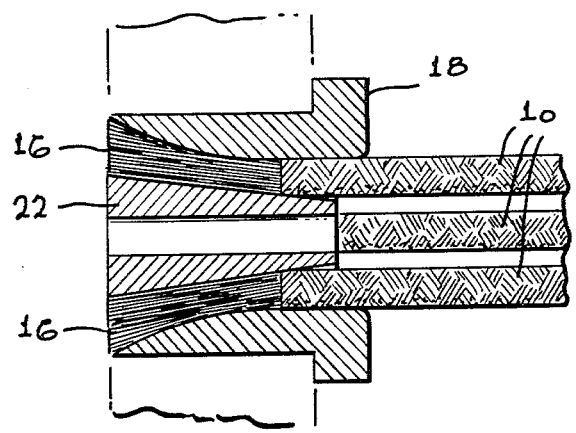
FIG. 5 is a side view, partly in section, of the structure of FIG. 4 with the centered tapered tube installed such as to wedge the fibers tightly between itself and the channel of said collar.

In FIG. 4 is shown a centering tool 20 having an extended shaft passing through a tapered tube 22 which has a uniform bore but which increases to a maximum outside diameter toward its outboard end. Tool 20 has a large diameter stop which is used to force tube 22 toward the inside of the collar 18. To assemble the termination, the separated or "fuzzed" ends 16 of the ropes are dipped in a suitable epoxy resin such as Phillstran A-14C resin and catalyst (also a product of Philadelphia Resins Corporation), the centering tool 20 and tube 22 are positioned as shown and the centering tube pulled toward the right, thus wedging the resin-coated separated fibers plus a significant length of braided rope tightly between tube 22 and collar 18, as shown in FIG. 5. The resin is then cured in a suitable manner. For the particular installation described, the centering tool is removed and the resin permitted to set for an hour or until gelled. The termination is then placed in an oven at 250°±10° F. for several minutes until the resin begins to set. Any of the individual fibers extending beyond the end of the resin plug are then trimmed flush with the end, and the termination is then replaced in the oven for one hour minimum. Alternatively it can cure in air for three days.

Figure 6:
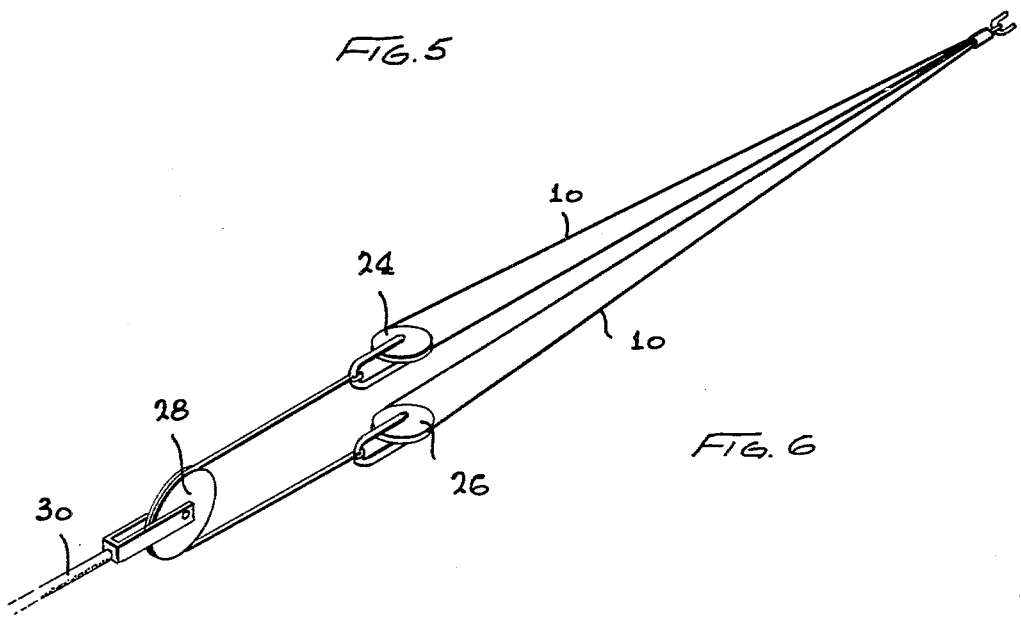
FIG. 6 is a perspective view of an arrangement for tensioning the rope structure of FIG. 5.

For a one-strand rope or for a rope of moderate strength, the above procedure would suffice. Where the cable consists of a plurality of ropes and particularly when it is terminated as described on both ends, it becomes necessary to stretch the ropes under tension in order to be certain they are the same length and all pulling essentially equally. One problem is that while the aramid fiber ropes vary somewhat in their tensile strength, a greater problem is presented by the fact that they also vary substantially as to their modulus of elasticity so that of the group of ropes one may stretch 3 to 6% more than the others.

Where a termination is to be attached at both ends, it is desirable to cut the ropes slightly more than double the length of the finished cable so that the four strands or ropes which are terminated as described are the opposite ends of two doubled-over lengths, thus leaving two loops on the opposite end. To tension these ropes and to equalize the lengths, each loop is assembled as shown in FIG. 6 onto one of two pulleys 24, 26 which are, in turn, fastened to a single larger pulley 28 by means of a larger cable 30. Pulley 28 is fastened to a winch which is capable of applying a very substantial force, such as 800 pounds. Initially a slight tension force is applied and the ropes checked to see that they are straight with no twists and that the pulleys are free to rotate. The pulleys are then subjected to a strong pull such as 800 pounds which is held for sixty seconds minimum. During this time it is advisable to measure, mark and record the lengths of each rope. The tension is then relaxed to about 10 pounds again, and the length recorded. Repeat these steps three times, recording the measurements. On a final tension cycle the ropes should be pulled up to approximately the tension it is expected to normally experience in service, each rope marked to the expected length, and then with the tension relaxed they are cut in half to make the desired four strands. These strands are then slipped through a collar similar to collar 18 and reinforced with tapered strands just as described above. The cut ropes are then tied back onto the two pulleys and tensioned to a moderate pull such as about 60 pounds. The ropes are then marked to the required length, the tension is released, and the ropes are cut at the marks, which must be even. The ends are then "fuzzed", dipped in resin, assembled and cured as described above. The entire cable may then be tension-tested to the desired strength level for a short time, such as ten seconds.

It will be recognized that the tension values selected and the times for tensioning specified happen to be those used by the inventor herein and can be subject to substantial variation, particularly where ropes of different sizes are used. Appropriate values will be apparent to those skilled in the art from knowledge of the specifications of the particular ropes or cables which are used.

What is claimed is:

1. A method of terminating a cable of nonmetallic fiber, having a plurality of braided strands comprising the steps of:
   (1) providing an annular collar member with a tapered internal channel, which gradually increases in diameter to a maximum opening toward a first end and which also increases in diameter toward the opposite end,
   (2) inserting a plurality of said braided strands through said collar member,
   (3) inserting a short length of stranded nonmetallic rope which has been tapered in diameter from full size to zero into the ends of each of said braided strands near the ends thereof,
   (4) separating the ends of said strands into individual generally axially directed fibers,
   (5) providing a tapered tube of smaller maximum outside diameter than the internal channel of said collar and a centering tool comprising a rod having a large diameter stop on one end and inserting said centering tool in said tapered tube,
   (6) immersing the ends of said strands constituting the individual axially directed fibers into a resin potting compound,
   (7) using the centering tool pulling said tapered tube and the separated ends of the strands plus a length of undisturbed braided strand into the internal channel of said collar member such that the maximum diameter portion of said tube is substantially concentric with the maximum opening of said channel, said tool being substantially aligned with the axis of said channel,
   (8) removing said centering tool and permitting said resin to cure, trimming the said fibers flush with the end of said resin.

2. A method of terminating a multiple strand rope as claimed in claim 1 wherein said curing step comprises initially letting the resin dry in air for approximately one hour and then placing it in an oven at approximately 250° F. for several minutes, trimming said fibers flush with the end of said collar, and replacing it in the oven until cured.

3. A method of terminating a multiple stranded rope as claimed in claim 1 wherein said braided strands are tied together with lacing cord at a distance from their ends somewhat greater than the length of said tapered stranded nonmetallic fiber ropes prior to insertion of said tapered rope.

4. A method of terminating a multiple stranded rope as claimed in claim 1 wherein subsequent to insertion of said tapered ropes each of said reinforced ropes is tightly wrapped with lacing cord at a distance from the ends thereof approximately equal to the lengths of said separated fibers.

5. A method of terminating a multiple stranded rope as claimed in claim 4 wherein during the separating of the ends of the strands into individual generally axially directed fibers any coating on said fibers is washed from said fibers.

6. A method of terminating a multiple stranded rope as claimed in claim 5 wherein said separating and washing step includes dipping the separated ends of said braided strands into freon, brushing with a wire brush to remove the coating, and blowing the rope dry after each dipping to prevent the freon from wicking up under the lacing cords.

7. A method of terminating a multiple stranded cable of aramid fiber or the like having a plurality of braided strands comprising the steps of
   (1) cutting strands of the cable to desired lengths,
   (2) cutting a plurality of short lengths of cable material and tapering said lengths to a diminishing thickness from one end to the other,
   (3) interweaving said short lengths of cable material into each of said strands of cable with the narrowest thickness extending into said cable so that said cable becomes thicker toward the end,
   (4) separating individual fibers of said reinforced cable for a short distance from its end,
   (5) removing the urethane matrix from said separated fibers,
   (6) forming a collar somewhat longer than the portion of said cable having separated strands, said collar having a bore which is narrowest a short distance from its inside end and which tapers to a substantially larger diameter toward its outside end,
   (7) forming a tapered tube having a maximum outside diameter near one end thereof and placing an elongated centering tool through the bore of said tube,
   (8) dipping said separated fibers of said braided strands in a resin potting compound,
   (9) using said centering tool, arranging said braided strands over said tube and wedging said braided strands tightly between said tube and said collar, and
   (10) curing said potting compound.

8. A method of terminating a multiple stranded cable as claimed in claim 7 wherein said strands are initially cut to slightly greater than twice the desired length of said cable such that loops are formed at the opposite ends thereof, said loops are assembled onto pulleys, and said pulleys are attached to tensioning means and are tensioned and, at least partially released a plurality of times, said strands are carefully measured, cut to desired lengths, reinforced, fuzzed, potted, assembled and cured.

9. A method of terminating a multiple stranded cable as claimed in claim 8 wherein said assembled cable is tensioned to a substantial proportion of its rated tensile strength following the second curing step.

10. A termination for a cable of nonmetallic fiber having a plurality of braided strands comprising:
    an annular collar member having an internal channel tapering outwardly toward the end of said cable,
    reinforcing means for said braided strands including a short length of stranded nonmetallic fiber rope tapered in diameter from somewhat less than the diameter of said braided strands to zero positioned in the ends of each of said braided strands, the ends of the reinforced braided strands being separated into individual fibers and with the urethane matrix removed from said fibers,
    a tapered tube of smaller maximum outside diameter than the internal channel of said collar concentrically positioned within said collar such that the maximum diameter portion of said tube is substantially concentric with the maximum internal diameter of said channel, and
    a resin potting compound securing the ends of said braided strands concentrically between said tube and said channel and axially with braided portions of said reinforced strands also secured between said tube and said collar, such that tension forces on said braided strands tend to wedge said strands and said potting compound more tightly between said collar and said tube.

11. A termination for a cable as claimed in claim 10 wherein the initial strands of said cable are formed approximately double length with each end forming one of said braided strands and leaving a loop at the opposite end.

12. A termination for a cable as claimed in claim 11 wherein said strands are tensioned and measured and cut to precise lengths, a second collar member placed over said new ends formed thereby, additional reinforcing lengths inserted in said new ends, said reinforced ends being separated, cleaned of urethane and coated with resin, and a tapered tube of smaller outside diameter than the internal channel of said collar concentrically positioned within said collar and said strands such that the resin-coated ends of said strands are secured between said tube and said collar.

* * * * *